(12) United States Patent
Barabé

(10) Patent No.: US 7,909,520 B2
(45) Date of Patent: Mar. 22, 2011

(54) TELESCOPIC VIEWING DEVICE

(76) Inventor: Jonathan Barabé, Québec (CA)

( * ) Notice: Subject to any disclaimer, the term of this patent is extended or adjusted under 35 U.S.C. 154(b) by 692 days.

(21) Appl. No.: 11/884,385

(22) PCT Filed: Feb. 16, 2006

(86) PCT No.: PCT/CA2006/000226
§ 371 (c)(1),
(2), (4) Date: Aug. 15, 2007

(87) PCT Pub. No.: WO2006/086879
PCT Pub. Date: Aug. 24, 2006

(65) Prior Publication Data
US 2008/0205875 A1    Aug. 28, 2008

Related U.S. Application Data

(60) Provisional application No. 60/653,123, filed on Feb. 16, 2005.

(51) Int. Cl.
*G03B 17/00* (2006.01)
(52) U.S. Cl. ....................................... 396/420

(58) Field of Classification Search .......... 396/419–422, 396/425, 427, 428; 235/462.41, 462.43, 235/462.45, 462.46
See application file for complete search history.

(56) References Cited

U.S. PATENT DOCUMENTS

| | | | |
|---|---|---|---|
| 5,065,249 A * | 11/1991 | Horn et al. .................... | 348/376 |
| 5,430,578 A | 7/1995 | Reagan | |
| 5,458,306 A * | 10/1995 | O'Farrill et al. .......... | 248/188.8 |
| 6,160,607 A | 12/2000 | Diaconu | |
| 6,293,676 B1 | 9/2001 | Holway | |
| 7,204,650 B2 * | 4/2007 | Ghanouni et al. ............ | 396/420 |
| 7,267,281 B2 * | 9/2007 | Hopkins .................. | 235/462.45 |
| 2004/0135879 A1 | 7/2004 | Stacy et al. | |

OTHER PUBLICATIONS

International Search Report.

* cited by examiner

*Primary Examiner* — W. B. Perkey
(74) *Attorney, Agent, or Firm* — Ogilvy Renault LLP

(57) ABSTRACT

A viewing device comprising: a handheld telescopic rod; a camera attached at a first end of the rod; and an output device mounted on a bottom half of the rod when fully extended, at an end opposite to the first end, the output device displaying images transmitted by the camera.

16 Claims, 5 Drawing Sheets

TELESCOPIC VIEWING DEVICE

CROSS-REFERENCE TO RELATED APPLICATIONS

This application claims priority of U.S. Provisional Patent Application No. 60/653,123 filed on Feb. 16, 2005.

TECHNICAL FIELD

The present invention relates to the field of precision sighting instruments for viewing obstructed areas.

BACKGROUND OF THE INVENTION

Large warehouse-type stores, such as IKEA, Home Depot, and Rona are quickly developing, not only in North America, but across the world. Most medium to large cities have at least one of these retail establishments where merchandise is kept in bulk in the warehouse and stored in boxes that are stacked on shelves. Consumers can roam the warehouse in search of a large variety of items and take their purchase home instantly, without needing to have it ordered and returning to the store to pick it up. These retail outlets house large goods, such as furniture that needs to be assembled, and smaller goods in large quantities, such as vats of paints or lacquer which are sold in bulk.

Storage room must be maximized in order to increase profitability. Such retail establishments must wisely use the space they have to maintain a large quantity of stock at all times. For this reason, multiple shelves are stacked one above the other to hold boxes of merchandise. Multiple boxes are put onto pallets, which are raised onto upper shelves using mechanical and electrical lifts. The boxes are usually tagged with bar codes in order to identify the contents therein.

Employees must regularly conduct inventory checks to confirm what stock remains and verify that nothing has been misplaced, damaged, or stolen. This is done manually by identifying the bar codes on the boxes and cross-checking them with a list of items. For boxes that are placed high-up on the shelves, the boxes must be lowered in order to read the bar codes and then replaced on the shelf. This is a very time-consuming operation that is usually done using lifting machinery. In other instances, the boxes which are lower are positioned such that the code is on the back side or in a hard to reach location. The boxes must be moved to allow someone to access the code and compare it to the information on the data sheets.

U.S. Pat. No. 5,636,918 describes a precision sighting device for viewing dark recesses as well as obstructed areas in general which are difficult to see with the naked eye. A longitudinally extendable/retractable rod is provided with a focusable light source and directed toward a mirror at an opposite end of the rod. The problem with this device is that in the case of a numerical code, the number appears backwards in the mirror. This makes it difficult for the user to identify the code properly.

Therefore, there is a need for a device which will allow a user to access hard to reach areas to read information on boxes, while providing the information in an easy to read fashion.

SUMMARY OF THE INVENTION

It is an object of the present invention to overcome the drawbacks of the prior art.

In accordance with a first broad aspect of the present invention, there is provided a viewing device comprising: a handheld telescopic rod; a camera attached at a first end of the rod; and an output device mounted on a bottom half of the rod when fully extended, at an end opposite to the first end, the output device displaying images transmitted by the camera.

Preferably, the camera is machine actuated so the user holding the rod can move the camera along at least one axe to position the lens in front of an object in hard to reach areas.

Also preferably, the display is actually part of a small computer having a screen, where the user can use a stylus to tap selections on menus and to enter printed characters. The unit may also include a small on-screen keyboard which is tapped with the pen. Data is synchronized between the computer on the device and a desktop computer via cable or wireless transmission.

In one embodiment of the present invention, additional tools may be attached to the extremity of the rod, to be used in conjunction with the camera. For example, a magnet, a clamp, a chemical sensing tool, a microphone, etc. In this embodiment, the camera would serve as the users eye in an attempt at a specific application, such as collecting items, data, molecules, etc.

In accordance with a second broad aspect of the present invention, there is provided a method for identifying a box in a warehouse, wherein an identifying mark is positioned on said box in a generally obstructed area, the method comprising: extending a retractable rod having a magnifying camera at a first end thereof; positioning the magnifying camera such that the identifying mark is in a field of view of the lens; transmitting an image of the identifying mark to a display at a second end of the rod; and viewing the identifying mark on the display.

Preferably, the method also comprises the step of matching the identifying mark on the box to a list of items. This can be done manually, by having a paper list to compare to, or directly on the display screen, which is part of a small computer allowing input and storage of data.

In accordance with a third broad aspect of the present invention, there is provided a viewing device comprising: a handheld telescopic rod; a first mirror mounted at a first end of the rod; and a second mirror mounted on the rod below the first mirror, the first mirror reflecting a virtual image of the item onto the second mirror, the second mirror reflecting a true image of the item, wherein the first and the second mirror are angled with respect to each other to provide the true image and allow a user manipulating the device to see the true image in the second mirror.

Preferably, a light source is directed to the second mirror to illuminate the true image, the mirrors are enlarging mirrors, and a machine actuated control device is present on the rod to control the telescopic rod and the mirrors.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
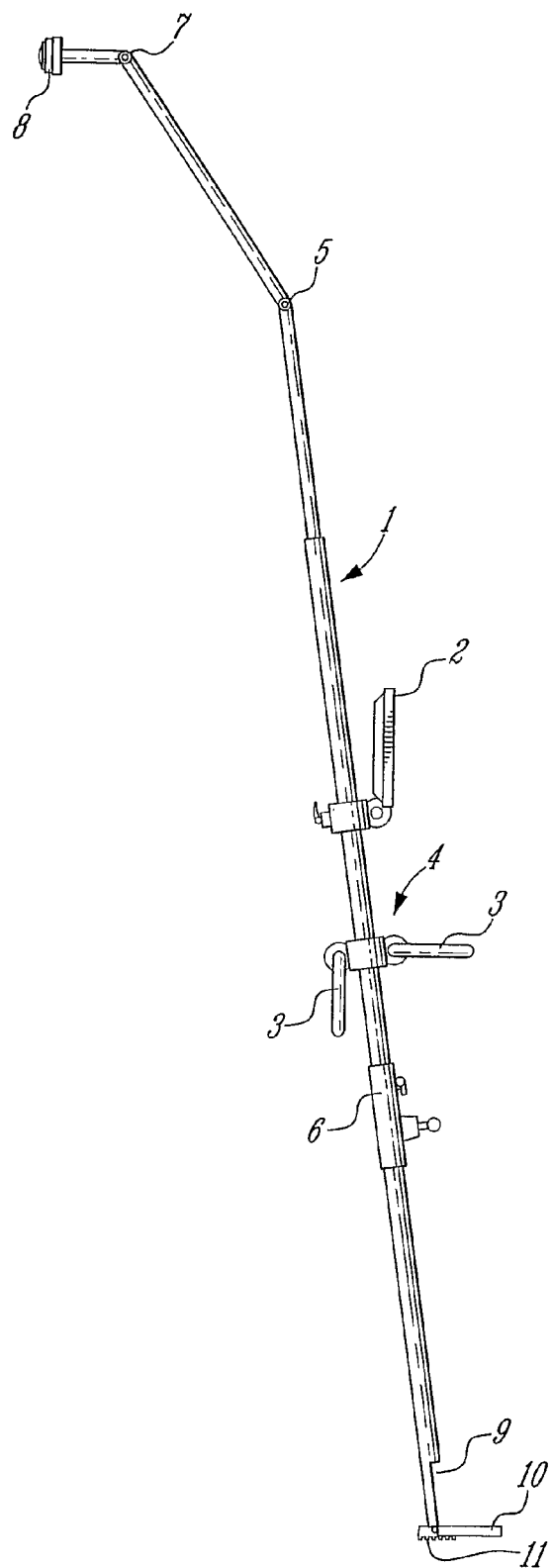
FIG. 1 is a handheld telescopic video-transmitting device.

FIG. 1 is a diagram of the preferred embodiment of the present invention. A telescopic rod 1 is extendible and retractable. The rod 1 can extend manually or be machine actuated. One way of realizing this feature is as a series of cylindrical members that are inserted one into the other and can be pulled out manually by the user. Alternatively, a series of foldable rod segments can be provided and each time a segment is unfolded, more distance is afforded by the device. Yet another realization is using a mechanism that controls the cylindrical members, such that the rod is extended and retracted by machine actuation. For example, a belting system with coils and springs. Any type of telescopic member found off-the-shelf in hardware stores will do. Other realizations are understood by those skilled in the art. The rod 1 can have one or more pivot points, such as pivot points 5 and 7, at which it can bend flexibly in order to access recessed areas.

An output display 2 is attached to the rod 1. The position of the display 2 on the rod 1 should be low enough for the user to view the display 2 as the rod 1 is being manipulated during the inspection process. Therefore, the display 2 can be positioned anywhere from the end of the rod 1 the user is holding to about the center of the rod 1. The display 2 should be on a portion of the rod 1 that does not extend telescopically. The display 2 can be pivotally adjustable by the user to a desired position. It can also be positioned parallel to the rod 1 for storing purposes in order to avoid any damages thereto. The display 2 receives images from a camera means 8 mounted to an end of the rod 1. The camera means 8 can be any type of camera, such as a digital camera, a barcode scanner, or any other type of laser scanning device or camera that can record images. If a digital camera is used, a magnifying lens is added in front of the camera's viewfinder in order to magnify items that are small, such as bar codes. Cameras that automatically magnify can also be used. For example, a spy camera that enlarges its field of view ×10 could be used.

The camera 8 can be a wireless camera that transmits images wirelessly to the display 2. Alternatively, the display 2 and camera 8 can be wired together to transmit the images. The camera 8 may be pivotally mounted to the rod 1 to allow movement along at least one axis. Preferably, the camera 8 is movable along the x and z axes, and is rotable around the y axis. This can be done manually, or using a machine actuated control device 6 to allow the user to control the movement of the camera 8 while manipulating the rod 1. This device should be at hand level for the user. At this same position on the device, any mechanisms used to control the extension of the rod 1 can also be provided. Near the control device 6 a handle 4 can be provided for the user to manipulate the rod 1. Independent levers 3 are provided on each side of the handle so that a left-handed or right-handed user can manipulate the rod 1 comfortably. When not in use, both levers 3 can be folded down and aligned with the rod 1.

In an alternative embodiment, the camera 8 is a barcode reader. The camera 8 automatically registers the barcode and can be linked to the contents of the box via a look-up table which matches barcodes and content. The look-up table can be displayed on a screen of the output display 2, which would then require more functions than a standard output display. A small personal computer, such as a PDA (personal digital assistant) can be used to store the information. The user can even check-off the items on the screen of the personal computer as each box is identified using its barcode. The personal computer can be used in the case of a standard camera as well. The user can match the label with information in a database stored in the personal computer and displayed on a screen.

Reference markers may be provided on the lens or on the display to facilitate such tasks as counting of items when using the device. The reference markers may be provided in color or simply in black, and may be activated by the user to appear on the screen/lens or removed when not needed.

At a second end of the rod 1, opposite to the end where the camera 8 is attached, a foothold 10 may be present. This is used to aid the user in resting the second end of the rod 1 on the ground to have stability while capturing an image. The foothold 10 may be pivoted up when not in use and down when used. In a preferred embodiment, a slot 9 is provided in the second end of the rod 1 to store the foothold 10 when not in use. A padding 11 can also be positioned on the bottom of the rod 1 to cushion the rod 1 when it is resting on the ground.

Figure 3:
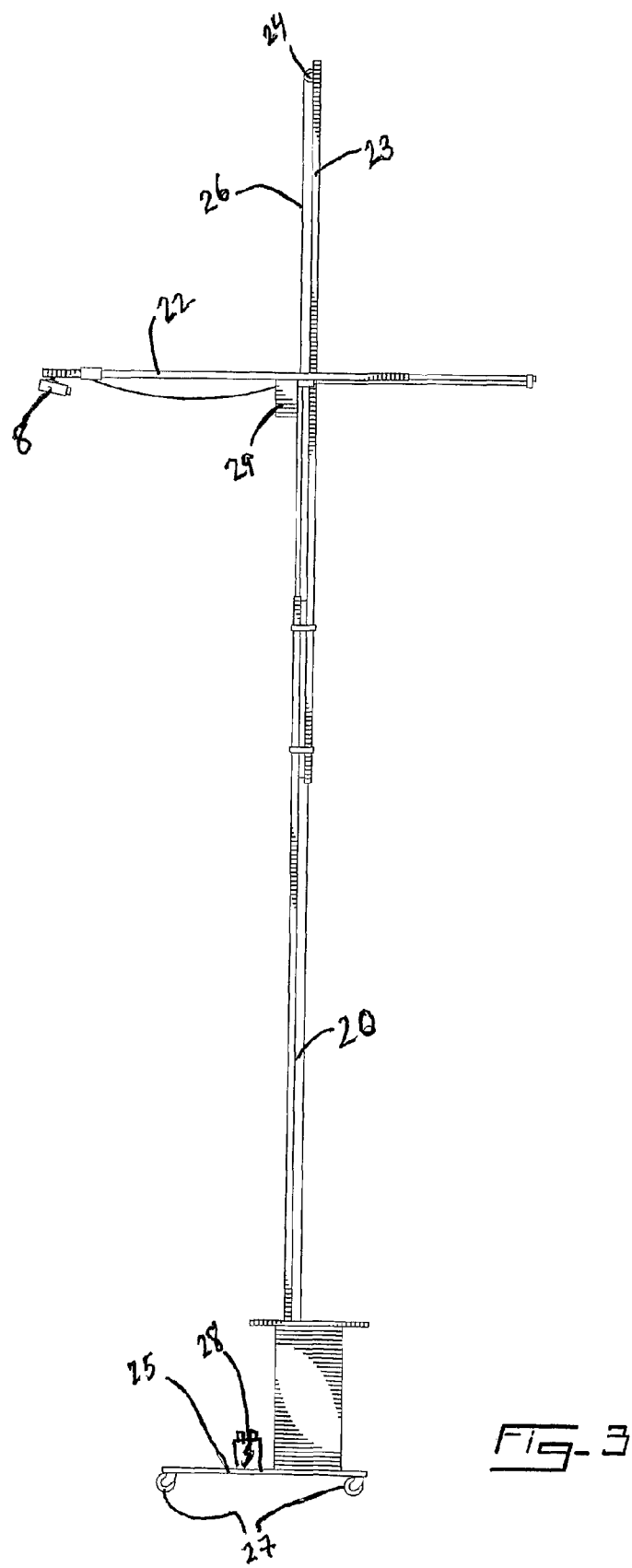
FIG. 3 is a telescopic video-transmitting device on a mobile base and operated by a cable winch system.

FIG. 3 illustrates another embodiment for the telescopic rod. The rod may be made up of a first member 20 to which a second member 22 is mounted perpendicularly. The second member 22 moves up and down the first member 20 to the desired height. Movement of the second member 22 is machine actuated, either by hydraulics, pneumatics, pulleys or some alternative mechanism known to a person skilled in the art. In FIG. 3, a cable winch system is used to move the horizontal second member 22 up and down the vertical first member 20. A reel with a steel cable turns in a clockwise direction to lower the second member 22 with the camera 8, and in the counter-clockwise direction to raise the second member 22 with the camera 8. The reel can also be mounted to work in the opposite directions. A third member 23 is attached to the first member 20 in order to provide more height to the device, and a hook 24 is provided through which the cable 26 used to raise and lower the second member 22 is passed. The winch cable system is powered by a battery 28 provided on the base 25.

In addition, the connection point between the first 20 and second 22 member may be a pivot point, thereby allowing the second member 22 to pivot up and down about an axis perpendicular to the first member 20. An electric motor 29 is used to rotate the second member 22, giving the camera 8 more range of motion. The battery 28 can also power this electric motor 29.

The first member 20 is provided on a base 25 to ensure stability to the viewing device. The camera 8 is attached to an end of the second member 22. A set of controls for the rod and the camera 8 can be provided on either the base 25 or the bottom portion of the rod. A display device may also be provided either on the base 25 or the bottom portion of the rod. The base may be mobile thanks to a set of wheels 27 provided underneath, allowing the viewing device to be transported with ease.

The viewing device may be attached to a small vehicle that can travel in and out of rows in a warehouse. A laptop computer 43 may be provided on the vehicle and connected to the device, thereby acting as the display and providing additional functions for inventory purposes. For example, the data collected may be immediately correlated to a database to update a system.

Figure 4A:
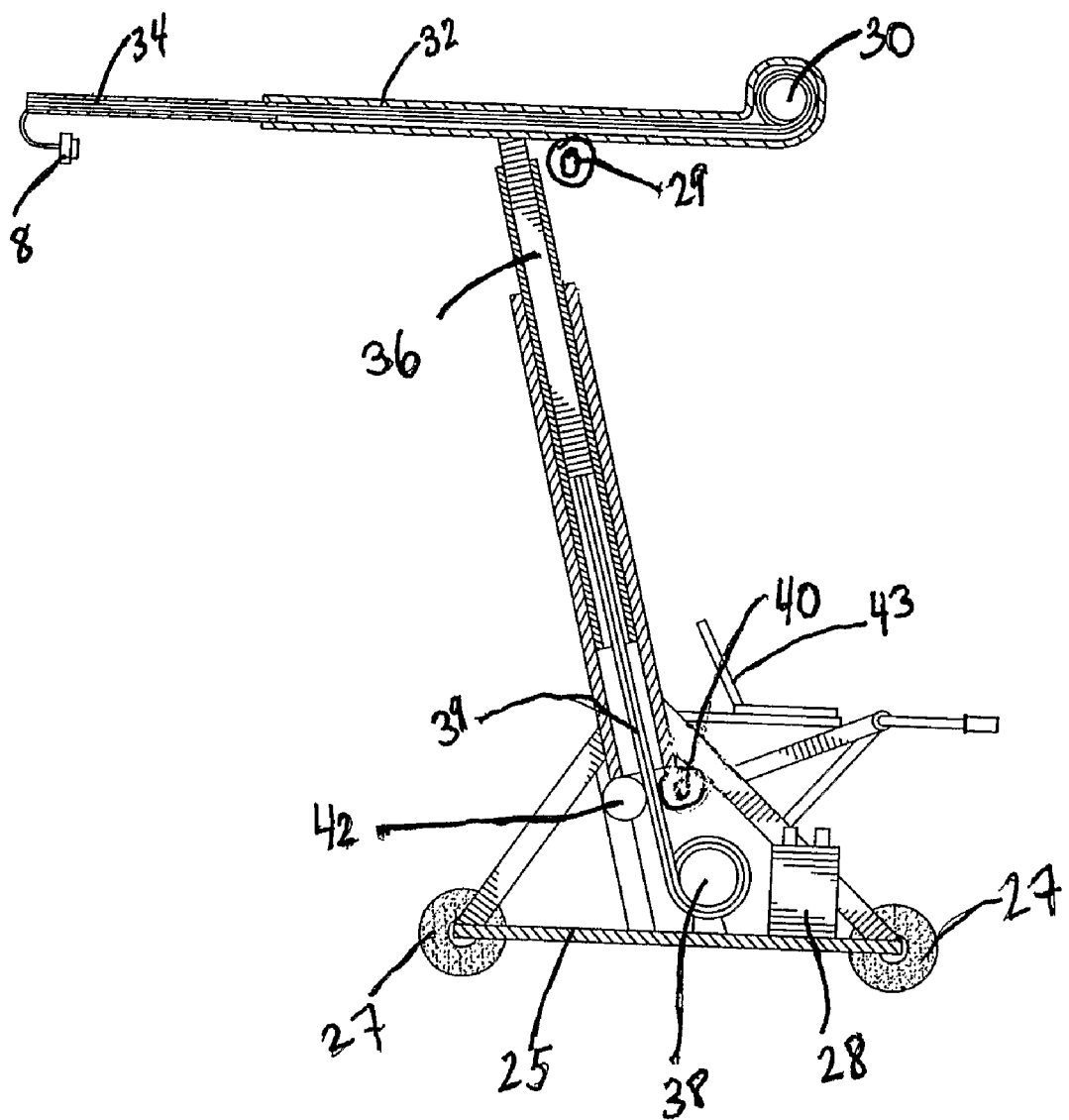
FIG. 4a is a telescopic video-transmitting device on a mobile base and operated by a belt system in the down position.
Figure 4B:
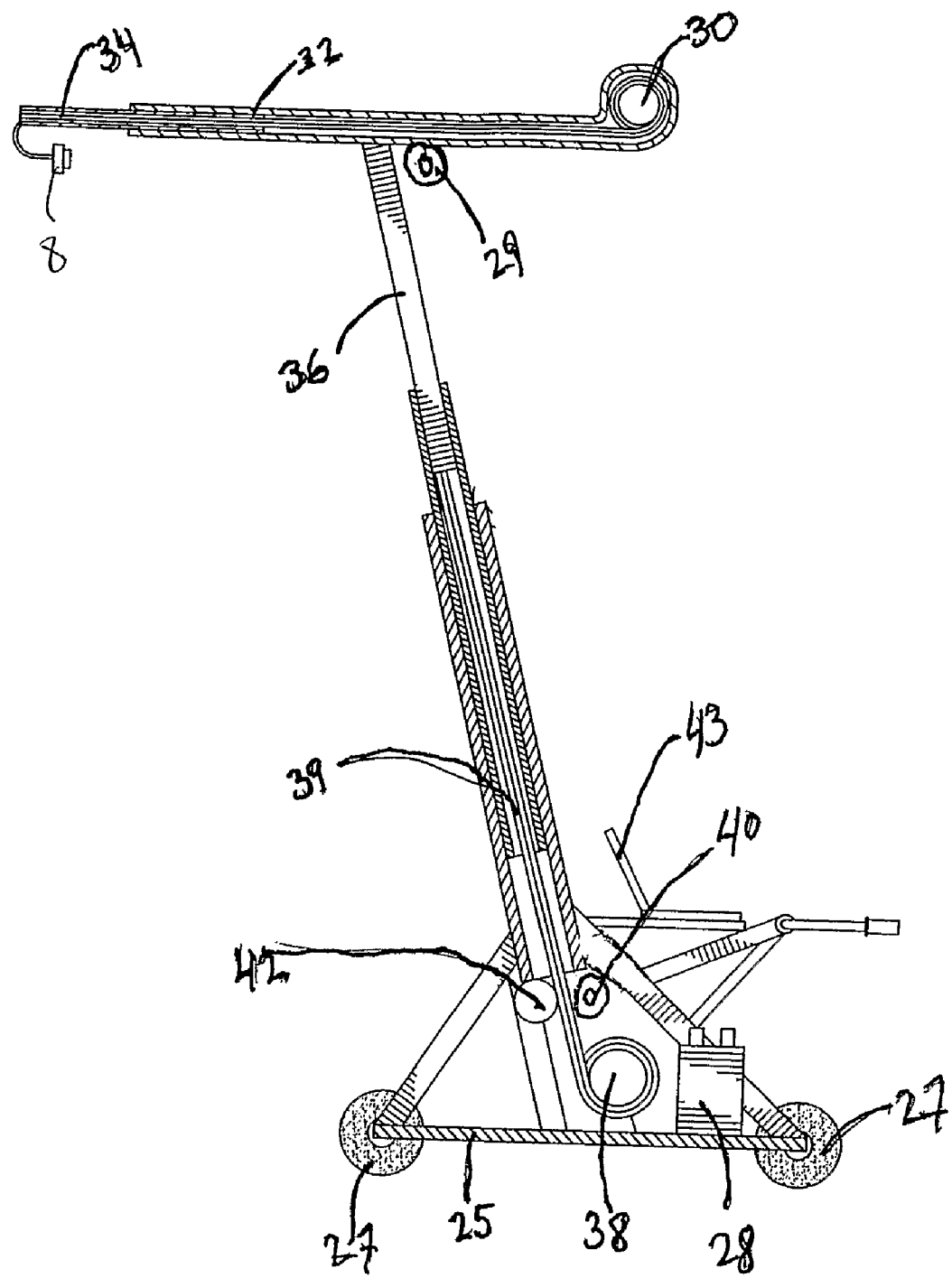
FIG. 4b is a telescopic video-transmitting device on a mobile base and operated by a belt system in the up position.

A different base is illustrated in FIGS. 4a and 4b. A different actuation mechanism is also shown. A coil or spool 30 is used to control a metallic ribbon 32. An electric motor 29 exerts a force opposite to that of the spool 30, which results in the winding/unwinding of the metallic ribbon 32. The movement of the metallic ribbon 32 causes the shaft 34 on which the camera 8 is fixed to move in and out. The shaft 34 is fixed to another shaft 36 which operates using the same principle in order to move the shaft 34 up and down. A second spool 38 with a belt 39, and another motor 40 work together to produce the movement. A cable drum 42 is used to guide the belt (or cable) properly. A laptop 43 is on the base 25. FIG. 4a shows when the camera 8 is at its lowest position, while FIG. 4b shows the shaft 36 extended upwards.

A lighting system provided with the viewing device can be controlled separately from or in conjunction with the camera mechanism.

Moreover, other tools may be provided at the end of the rod in addition to the camera. For example, a clamp can be added to allow the user to grasp items or objects in hard to reach places. The camera and output device are used together with the clamp by the user manipulating the rod. Other tools, such as magnets, or hooks can replace the clamp. Alternatively, a microphone (or any type of audio recording device) can be provided with the camera. In another embodiment, a tool used to collect chemical products from the air can be attached to the end of the rod. The camera is then used to position the tool or read information provided on the tool.

A method of the present invention is for identifying a box in a warehouse, wherein an identifying mark is positioned on the box in a generally obstructed area. The identifying mark may be a hand-written label, a typed label, a bar code, or any other type of mark on the box which is used to identify the contents of the box. The device is held by the user at a lower portion of the rod. The device should be light enough to be manipulated by an average-sized user. For boxes that are high up, the camera end is pointed upwards. The device can also be used for boxes that are at ground level but where the identifying mark is obstructed from view, for example, by being on the backside of the box. The camera end is pointed and the user can see what is in the field of view of the camera via the display on the rod. The user positions the camera by moving the rod. The opposite end of the rod can rest on the ground while the user moves the camera end. A foothold can be brought down to aid the user in stabilizing the rod.

Alternatively, the user can position the rod approximately and then use machine actuated controls of the camera to position the view finder of the camera. The controls should be at hand level to minimize hand motion required by the user when manipulating the device. The controls to extend and retract the rod should also be at the same level as any controls used to position the camera. The controls for the telescopic rod can be up, down, and, on, off. The controls for moving the camera can be left, right, up, down, and rotate.

The user controls the position of the camera until the identifying mark is visible on the display. Pivot points on the rod are also used to position the rod at a desired location. Having the rod flexible allows the user to bend the rod at the pivot points to go behind boxes in recessed areas.

When the identifying mark is displayed on the output display, the user can match it with a checklist. If the display is actually part of a personal computer, the checklist may be on the display itself, and the user simply needs to use a stylus to check the item on the list. Alternatively, the user can match the identifying mark with an item on a paper checklist.

In yet another alternative embodiment, the telescopic rod is attached to another telescopic member 15. This member 15 has a double-mirror arrangement used to see true images of objects. The first mirror 13 reflects a virtual image onto the second mirror 12. The second mirror shows a true image by reversing the image shown in the first mirror 13. A light source 14 is provided on the first mirror 13 to illuminate the view and provide a brighter image. The light source 14 may be controlled by the same machine actuated control device 6 that controls the rod 1. A control button for the light can also be provided at another location on the rod 1.

The mirrors 12 and 13 should be minimized in size in order to facilitate the passage of the rod 1 in areas with limited space. However, the mirrors 12 and 13 must be large enough to provide a full image. Enlarging mirrors may be used to enlarge the image. The mirrors are provided on a portion of the rod 1 which is above the pivot point 5. The user can pivot the second member 15 using machine actuation. The pivot can be activated using the control device 6. The mirrors 12 and 13 are positioned at an angle to properly reflect the image from the first mirror 13 to the second mirror 12. The position of the mirrors 12 and 13 can be controlled by machine actuation to bring the mirrors closer together or further apart. The mirrors can be moved about an axis to change their respective angles, or they can be moved with respect to each other while maintaining the angle at which they are positioned. This movement allows the user to pass the rod in areas where there is not a lot of space. Movement of the mirrors may also be done manually.

Figure 2:
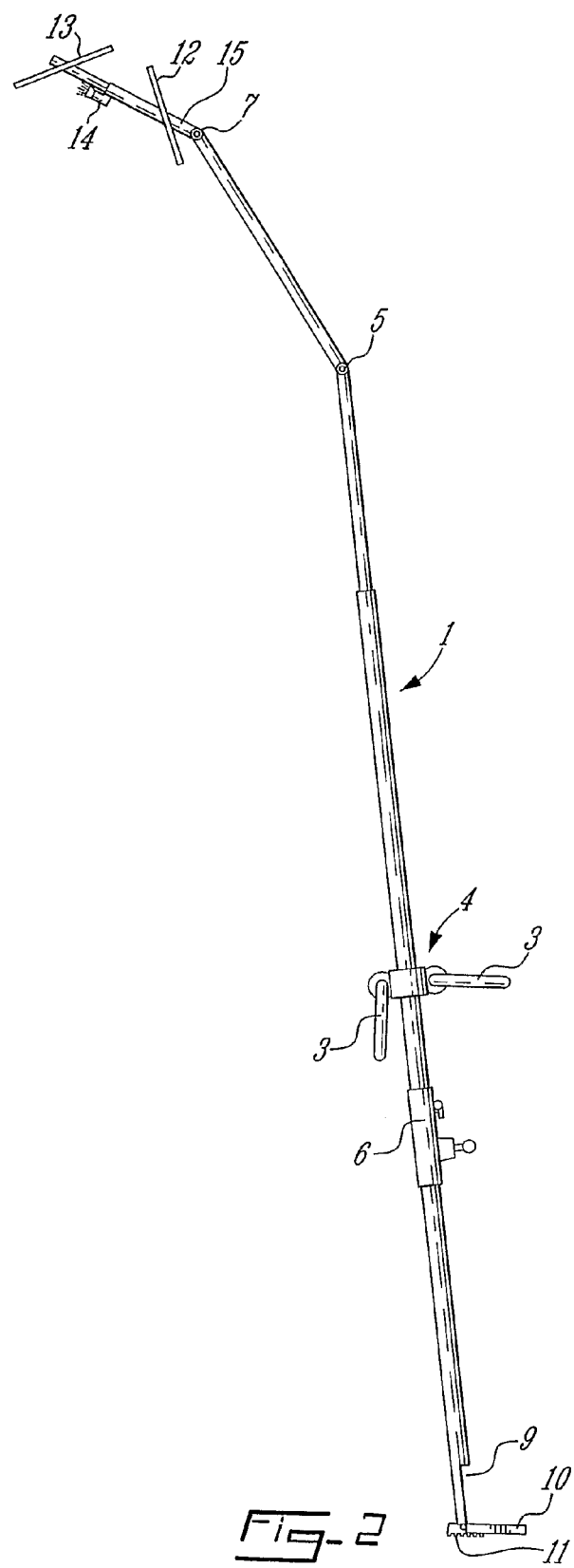
FIG. 2 is a double-mirror telescopic viewing device.

The rod 1 shown in FIG. 2 also has a handle 17 at the end thereof. This handle 17 may be made of rubber or any other type of material which would provide a comfortable and solid grip.

The embodiments of the invention described above are intended to be exemplary only. The scope of the invention is therefore intended to be limited solely by the scope of the appended claims.

I claim:

1. A viewing device comprising:
a handheld telescopic rod having at least one pivot point along which said handheld telescopic rod is bendable, for positioning a first end of said rod at a fixed angle with respect to a second end of said rod;
a camera attached at the first end of said rod; and
an output device mounted on a bottom half of said rod when fully extended, at said second end opposite to said first end, said output device displaying images transmitted by said camera.

2. A viewing device as claimed in claim 1, wherein said camera is a magnifying camera.

3. A viewing device as claimed in claim 1, wherein said camera is pivotally mounted to said rod to move along at least one of an x, y, and z axis.

4. A viewing device as claimed in claim 3, wherein said camera is machine actuated to move along said at least one of an x, y, and z axis.

5. A viewing device as claimed in claim 1, wherein said telescopic rod is machine actuated.

6. A viewing device as claimed in claim 1, wherein said output device comprises a computer including a memory having a look-up table to match an identifying mark recorded by said camera to an item in said look-up table.

7. A viewing device as claimed in claim 6, wherein said computer is a personal digital assistant.

8. A viewing device as claimed in claim 1, wherein a handle is mounted to said bottom half of said rod for manipulating said viewing device.

9. A viewing device as claimed in claim 1, wherein a foothold is provided at said second end, for supporting said viewing device.

10. A method for identifying a box in a warehouse, wherein an identifying mark is positioned on said box in a generally obstructed area, the method comprising:

extending a retractable rod having at least one pivot point and a magnifying camera at a first end thereof;

bending said rod at said at least one pivot point and positioning said magnifying camera such that said camera is positioned behind said box and said identifying mark is in a field of view of a magnifying lens;

transmitting an image of said identifying mark to a display at a second end of said rod; and viewing said identifying mark on said display.

11. A method as claimed in claim 10, further comprising matching said identifying mark with an item on a list.

12. A method as claimed in claim 11, wherein said matching comprises matching from a lookup table.

13. A method as claimed in claim 12, wherein said display is a screen from a personal computer comprising a database to store information relating to said identifying mark.

14. A method as claimed in claim 10, wherein said positioning said magnifying camera comprises rotating said camera by machine actuation.

15. A method as claimed in claim 10, wherein said extending said retractable rod comprises extending and retracting by machine actuation.

16. A method as claimed in claim 10, wherein said bending said rod comprises controlling the at least one pivot point of said rod by machine actuation.

\* \* \* \* \*